United States Patent
Baum et al.

(10) Patent No.: US 7,634,031 B2
(45) Date of Patent: Dec. 15, 2009

(54) METHOD AND APPARATUS FOR ENCODING SYMBOLS CARRYING PAYLOAD DATA FOR WATERMARKING AN AUDIO OR VIDEO SIGNAL, AND METHOD AND APPARATUS FOR DECODING SYMBOLS CARRYING PAYLOAD DATA OF A WATERMARKED AUDIO OR VIDEO SIGNAL

(75) Inventors: Peter Georg Baum, Hannover (DE); Walter Voessing, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 564 days.

(21) Appl. No.: 11/376,530

(22) Filed: Mar. 15, 2006

(65) Prior Publication Data

US 2006/0212710 A1 Sep. 21, 2006

(30) Foreign Application Priority Data

Mar. 18, 2005 (DE) ................................. 050 90 072

(51) Int. Cl.
H04L 27/06 (2006.01)
(52) U.S. Cl. ....................... 375/341; 713/176; 382/100; 375/262; 375/265
(58) Field of Classification Search ................ 375/341, 375/137, 149, 133, 262, 265; 713/176, 168, 713/160, 170; 714/795, 791, 799, 800, 801; 382/100; 358/3.28, 382; 283/113; 380/269, 380/270

See application file for complete search history.

(56) References Cited

U.S. PATENT DOCUMENTS 6,522,769 B1 * 2/2003 Rhoads et al. .............. 382/100

(Continued)

FOREIGN PATENT DOCUMENTS

EP 0 913 952 A2 5/1999

(Continued)

OTHER PUBLICATIONS

Loboguerrero A. et al. "Iterative informed audio data hiding scheme using optimal filter" Communication Technology Proceedings, 2003, ICCT 2003. International Conference on Apr. 9-11, 2003, Piscataway, New Jersey, USA, IEEE, vol. 2, Apr. 9, 2003, pp. 1408-1411, XP010644113 isbn: 8-5635-0686-1 p. 1408 right hand column, last paragraph.

(Continued)

Primary Examiner—Shuwang Liu
Assistant Examiner—Rahel Guarino
(74) Attorney, Agent, or Firm—Robert D. Shedd; Joseph J. Opalach; Jerome G. Schaefer (57) ABSTRACT

Watermark information (denoted WM) consists of several symbols which are embedded continuously in an audio or a video signal. At decoder site the WM is regained using correlation of the received signal with an m-sequence if Spread Spectrum is used. According to the invention, each WM symbol carries an identification data ID item in addition to its normal payload, and it is already tested in the encoder whether or not the signal is good enough so that the embedded symbol can be recovered at decoder side. If true, it is embedded. If not true, no WM is embedded for the length of one symbol and the test is repeated for the following symbol. The sequence of IDs is known at the encoder which can therefore detect using the ID whether or not a symbol has been skipped.

20 Claims, 4 Drawing Sheets

U.S. PATENT DOCUMENTS

| | | | |
|---|---|---|---|
| 7,212,649 B2* | 5/2007 | Watanabe et al. | 382/100 |
| 2004/0001607 A1* | 1/2004 | Hwang et al. | 382/100 |
| 2004/0131030 A1* | 7/2004 | Kuroyanagi et al. | 370/335 |

FOREIGN PATENT DOCUMENTS

| | | |
|---|---|---|
| EP | 1 2200152 A2 | 7/2002 |
| EP | 1 306 802 A2 | 5/2003 |

OTHER PUBLICATIONS

EPO Search Report Attached.

Ying-Gen, Hsia et al. "Multiiple-Description Coding for Robust Image Watermarking," Image Processing, 2004, ICIP '04. 2004 International Conference on, vol. 4, pp. 2163-2166. Oct. 24, 2004. IEEEE, Piscataway, NJ USA. XP010786211.

European Search Report dated Jun. 9, 2006.

* cited by examiner

METHOD AND APPARATUS FOR ENCODING SYMBOLS CARRYING PAYLOAD DATA FOR WATERMARKING AN AUDIO OR VIDEO SIGNAL, AND METHOD AND APPARATUS FOR DECODING SYMBOLS CARRYING PAYLOAD DATA OF A WATERMARKED AUDIO OR VIDEO SIGNAL

This application claims the benefit, under 35 U.S.C. § 119 of German Patent Application 05090072.9, filed Mar. 19, 2005.

FIELD OF THE INVENTION

The invention relates to a method and to an apparatus for encoding symbols carrying payload data for watermarking an audio or video signal, and to a method and to an apparatus for decoding symbols carrying payload data of a watermarked audio or video signal.

BACKGROUND OF THE INVENTION

Watermark information (denoted WM) consists of several symbols which are embedded continuously in the carrier content, e.g. in (encoded) audio or video signals, e.g. in order to identify the author of the signals. At decoder site the WM is regained, for example by using correlation of the received signal with a known m-sequence if spread spectrum is used as underlying technology. In some watermark technology the watermark information is transmitted asynchronously, i.e. it is continuously tested whether or not WM can be embedded imperceptible within the (encoded) audio or video signals. Only if this is true a WM frame is transmitted. But a WM frame consists of some tens of symbols, each carrying one or more bits which are transmitted synchronously. That means, if the period in which the WM can be embedded is shorter than the frame length, some symbols cannot be recovered at receiver side.

Most WM technologies therefore transmit redundancy bits for error correction. But such error correction has a limited capacity only. An error correction can correct some symbols, if one or more symbols cannot be directly recovered at receiver side. But if the capacity of the error correction is exceeded, the WM can not be recovered.

Secondly, additional redundancy bits increase the length of the WM frame, which results in a higher probability that the frame is longer than the signal length in which the WM frame can be transmitted. Thirdly, error correction is mostly independent of the signal to be watermarked which results, due to the necessary parity bits, in a lower than necessary net bitrate for a 'good' signal and still not enough error correction for 'bad' signals. A 'good' signal can be recovered at decoder side whereas a 'bad' signal can not be recovered.

WO-A-01/06755 shows an energy level-dependent insertion of watermark data.

SUMMARY OF THE INVENTION

In known WM systems the signal in which the WM is embedded must be 'good' for a time period that is at least as long as a frame length, with not more 'bad' parts than the error correction can cope with.

A problem to be solved by the invention is to provide a watermarking in which the available time periods for transmitting WM are exploited as far as possible, without spending unnecessary additional redundancy bits for error correction purposes.

According to the invention, each WM symbol carries an identification data item (denoted ID) in addition to its normal payload, and it is already tested in the encoder whether or not the signal is 'good' enough so that the embedded symbol can be recovered at receiver or decoder side. If true, it is embedded normally. If not true, no WM is embedded for the length of one symbol and the test is repeated for the following signal and the same symbol. The sequence of IDs is known at the encoder, which can therefore detect using the ID whether or not a symbol has been skipped.

According to the invention the signal must be 'good' only for a time period that is as long as a symbol length. If not, it is transmitted later when the content is better suited for embedding it. This makes a big difference in signals having many silent periods (i.e. pauses), e.g. speech signals.

The invention makes watermarking of critical sound signals much more robust, which may make the difference between receiving WM and receiving no WM at all. The above tests carried out in the encoder cost more processing power since multiple correlations are to be calculated following empty blocks. But advantageously, for non-critical sound signals, i.e. signals in which no empty blocks are inserted and which result in a clear peak in the correlation with a predetermined data sequence, the inventive processing does not even use more processing power in the decoder.

The invention is not limited to using spread spectrum technology. Instead e.g. carrier based technology or echo hiding technology can be used for the watermarking coding and decoding.

In principle, the inventive method is suited for encoding symbols carrying payload data for watermarking therewith an audio or video signal, said watermarking using for example spread spectrum modulation whereby said symbols can be recovered by de-spreading and demodulation using correlation with a known data sequence, whereby said symbols can be recovered at decoding side, and whereby at least one of said symbols and at least one synchronization block are combined to form a current watermark frame, said method comprising the steps:

a) encoding said payload data, thereby generating an evolving ID data item for each one of said symbols;
b) checking at encoder side whether or not a current one of said symbols can be correctly decoded in a corresponding decoder:
if true, arranging said current symbol in said current frame together with said ID data item, and if said current frame has not been processed completely, continuing with step a), or if not true, skipping said current symbol in said current frame by arranging an empty symbol in said current frame that does not include the corresponding one of said ID data items, and if said current frame has not been processed completely, continuing with step a) using the ID data item that was intended for the symbol at the location of said empty symbol;
c) after said current frame has been processed completely, outputting said current frame embedded in said audio or video signal, and continuing the processing with the next frame.

In principle the inventive apparatus is suited for encoding symbols carrying payload data for watermarking therewith frame-by-frame an audio or video signal, said watermarking using for example spread spectrum modulation whereby said symbols can be recovered by de-spreading and demodulation using correlation with a known data sequence, whereby said symbols can be recovered at decoding side, and whereby at least one of said symbols and at least one synchronization block are combined to form a current watermark frame, said apparatus comprising:
  means being adapted for encoding said payload data, thereby generating an evolving ID data item for each one of said symbols;
  means being adapted for checking whether or not a current one of said symbols can be correctly decoded in a corresponding decoder, which means:
if true, arrange said current symbol in said current frame together with said ID data item, and if said current frame has not been processed completely, continue the processing in said encoding means,
or if not true, skip said current symbol in said current frame by arranging an empty symbol in said current frame that does not include the corresponding one of said ID data items, and if said current frame has not been processed completely, the processing in said encoding means using the ID data item that was intended for the symbol at the location of said empty symbol;
  means being adapted for outputting, after said current frame has been processed completely, said current frame embedded in said audio or video signal.

In principle, the inventive method is suited for decoding symbols carrying payload data of a watermarked audio or video signal, said watermarking using for example spread spectrum modulation, whereby at least one of said symbols and at least one synchronization block were combined to form a current watermark frame, for example by de-spreading and demodulating using correlation with a predetermined data sequence, and whereby said audio or video signal was watermarked by:
a) encoding said payload data, thereby generating an evolving ID data item for each one of said symbols;
b) checking whether or not a current one of said symbols could be correctly decoded in a corresponding decoder:
if true, said current symbol was arranged in said current frame together with said ID data item, and if said current frame had not been processed completely, the processing was continued with step a),
or if not true, said current symbol was skipped in said current frame by arranging an empty symbol in said current frame that does not include the corresponding one of said ID data items, and if said current frame had not been processed completely, the processing was continued with step a) using the ID data item that was intended for the symbol at the location of said empty symbol;
c) after said current frame was processed completely, outputting said current frame embedded in said audio or video signal, and continuing the processing with the next frame, and in that said decoding method includes the further step:
following a decoding processing of a current symbol with a predetermined data sequence that is related to a current one of said ID data items, determining whether or not said decoding processing yields an explicit result:
if true, providing said processed current symbol of said current frame,
or if not true, skipping said current symbol in said current frame,
wherein said decoding processing is for example a correlation with a predetermined data sequence.

In principle the inventive apparatus is suited for decoding symbols carrying payload data of a watermarked audio or video signal, said watermarking using for example spread spectrum modulation, whereby at least one of said symbols and at least one synchronization block were combined to form a current watermark frame, and whereby said decoding apparatus includes decoding means being adapted for recovering said symbols, for example by de-spreading and demodulating using correlation with a predetermined data sequence, and wherein said audio or video signal was watermarked by:
a) encoding said payload data, thereby generating an evolving ID data item for each one of said symbols;
b) checking whether or not a current one of said symbols could be correctly decoded in a corresponding decoder:
if true, said current symbol was arranged in said current frame together with said ID data item, and if said current frame had not been processed completely, the processing was continued with step a),
or if not true, said current symbol was skipped in said current frame by arranging an empty symbol in said current frame that does not include the corresponding one of said ID data items, and if said current frame had not been processed completely, the processing was continued with step a) using the ID data item that was intended for the symbol at the location of said empty symbol;
c) after said current frame was processed completely, outputting said current frame embedded in said audio or video signal, and continuing the processing with the next frame, and whereby said decoding apparatus further includes means being adapted for determining, following a decoding processing of a current symbol that is related to a current one of said ID data items, whether or not said decoding processing yields an explicit result which means:
if true, provide said demodulated current symbol of said current frame,
or if not true, skip said current symbol in said current frame,
wherein said decoding processing is for example a correlation with a predetermined data sequence.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS

Figure 3:
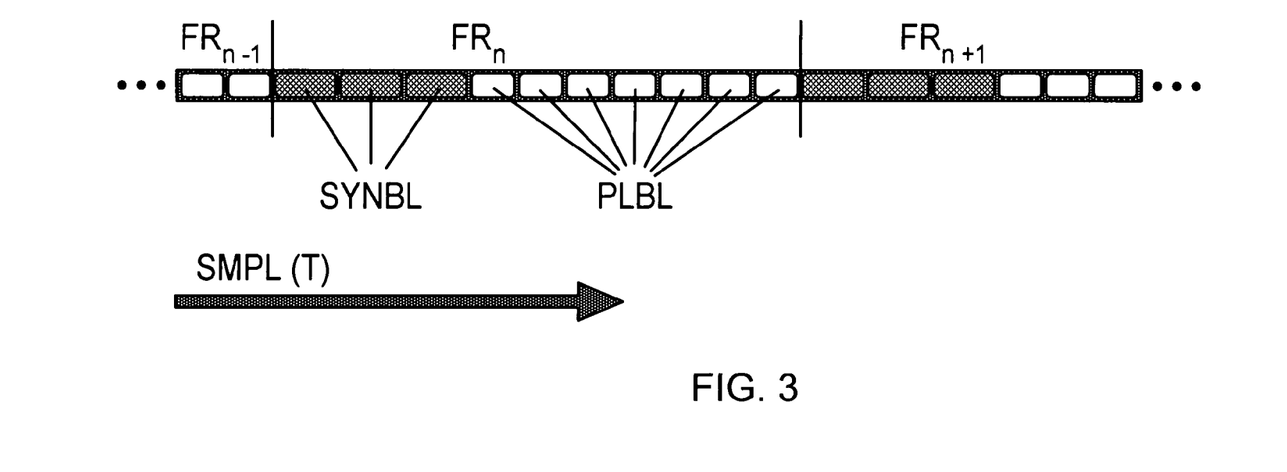
FIG. 3 frame composition.

The smallest self-containing unit of a watermark is called a frame. FIG. 3 shows three successive frames $FR_{n-1}$, $FR_n$ and $FR_{n+1}$. A frame consists of a number of synchronization blocks SYNBL (at least one synchronization block) which are needed to detect the start of the frame at decoder side, and a number of payload blocks PLBL (at least one valid payload block or symbol) which carry the actual information. Frames are inserted synchronously or asynchronously in the audio stream, dependent on the technology. The insertion of the payload blocks is done consecutively, i.e. synchronised after the SYNBL blocks. Each payload block holds one or more bits of information. A payload block is therefore also called a symbol. The payload symbols include the information to be inserted into the watermark information WM, and optionally contain redundancy information used for error correction. A typical setting is for example 5 synchronization blocks and 36 payload blocks per frame, each payload block carrying 2 bits, whereby 24 of these 72 bits are used for error correction resulting in a net payload of 48 bits per frame.

Figure 1:
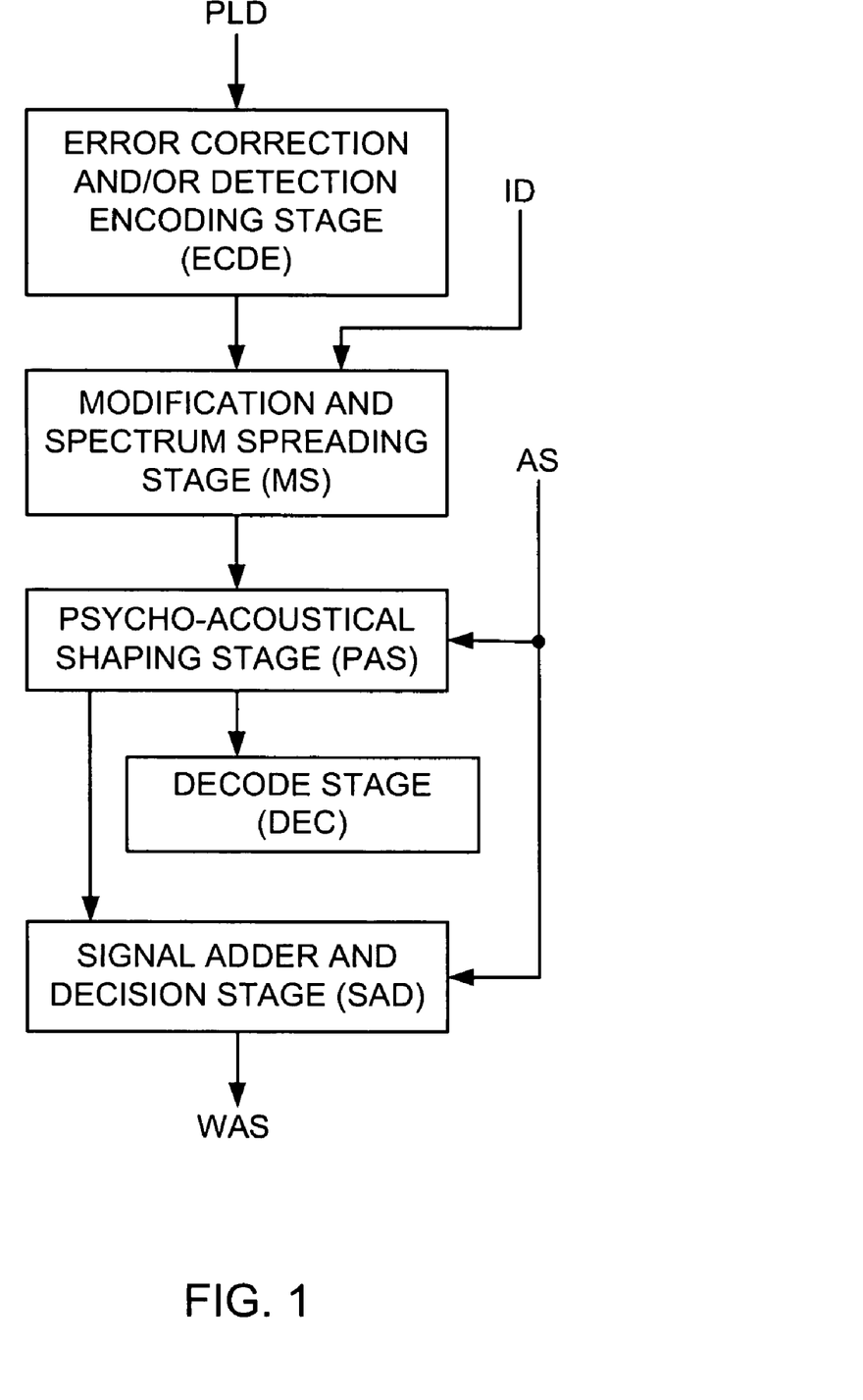
FIG. 1 inventive watermark encoder.

In the watermarking encoder in FIG. 1 payload data PLD to be used for watermarking an audio signal AS is input to an error correction and/or detection encoding stage ECDE which adds redundancy bits facilitating a recovery from erroneously detected symbols in the decoder. In a downstream modulation and spectrum spreading stage MS an identification data item ID is combined with the signal. The output signal of stage MS is fed to a psycho-acoustical shaping stage PAS which shapes the MS signal such that the WM is not audible or visible, and which feeds its output signal to a signal adder and decision stage SAD and to a decoder stage DEC. The decoder stage DEC implements a decoder according to FIG. 2. Stages PAS and SAD each receive the audio stream signal AS and process the WM frames symbol by symbol. Stage SAD determines whether the payload data PLD have been decoded correctly in decoder DEC for a current WM frame $FR_n$. If true, the psycho-acoustical shaped WM symbol is added to the current frame. If not true, the current symbol in the current frame $FR_n$ is skipped. Thereafter the processing continues for the next symbol following the current symbol. After the processing for a WM frame is completed a correspondingly watermarked frame WAS embedded in the audio signal is output. Thereafter the processing continues for the frame $FR_{n+1}$ following the current frame.

Figure 2:
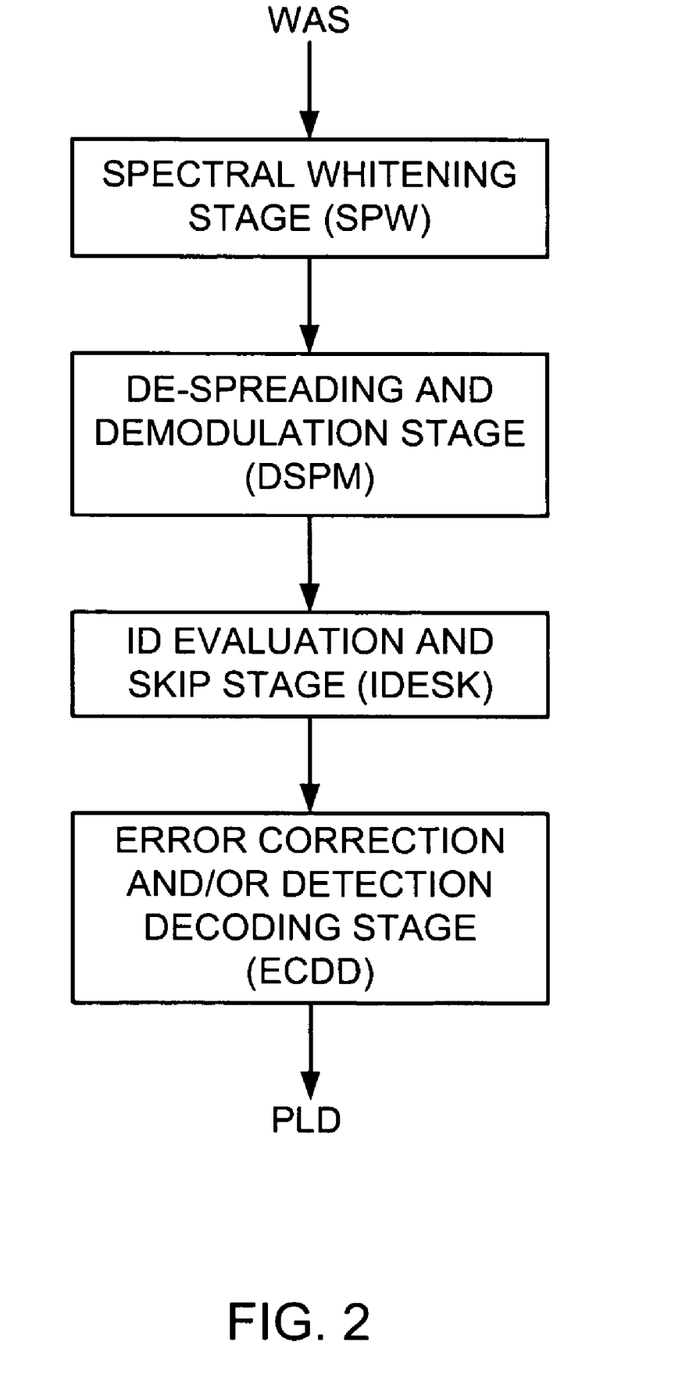
FIG. 2 inventive watermark decoder.

In the watermarking decoder in FIG. 2 a watermarked frame WAS of the audio signal passes through a spectral whitening stage SPW (which reverses the shaping that was done in stage PAS) and a de-spreading and demodulation stage DSPDM (which retrieves the embedded data from the signal WAS) to an ID evaluation and skip stage IDESK. In stage IDESK it is checked whether or not a received symbol or block of a received WM frame has a correct ID, i.e. whether or not the received ID is in a chronological order. If not true, the corresponding WM symbol is skipped. If true, the WM symbol is passed to an error correction and/or detection decoding stage ECDD that outputs the valid payload data PLD.

The watermark is shaped block wise according to psycho-acoustic principles, i.e. the ratio between watermark and audio energy may change from symbol to symbol. For some signals the possible quality of the embedded watermark is so poor, that it is known already at encoder side that symbols which are embedded in these signals cannot be recovered correctly at decoder side.

According to the invention for each symbol to be embedded in the audio signal it is decided in the encoder, whether or not it can be recovered correctly in a decoder. If the probability that it can be recovered is high, it is inserted in the audio. If not, no additional WM signal is inserted for a time duration of one symbol length, or an empty symbol representing zeroes only is inserted, and the test is repeated until the signal is suitable for embedding of the next WM item. Each empty symbol inserted increases the frame length by one symbol length, such that each frame carries the same number of payload bits per frame.

FIG. 4A shows an example in which the depicted part of the signal is suitable for embedding of WM. The symbols are therefore embedded continuously. In FIG. 4B the signal is not suitable for embedding a WM at the third symbol. Therefore no symbol is embedded after symbol two (instead an empty symbol is inserted), and the signal is tested at the next possible insertion point again, but the signal is still not suitable. So, the insertion of a non-empty symbol is postponed again. The next test is successful and symbol three is inserted. This means that the decoder receives symbol one, then symbol two, then two times empty symbols (i.e. a pure audio signal without watermark), then symbol number three.

Figure 4:
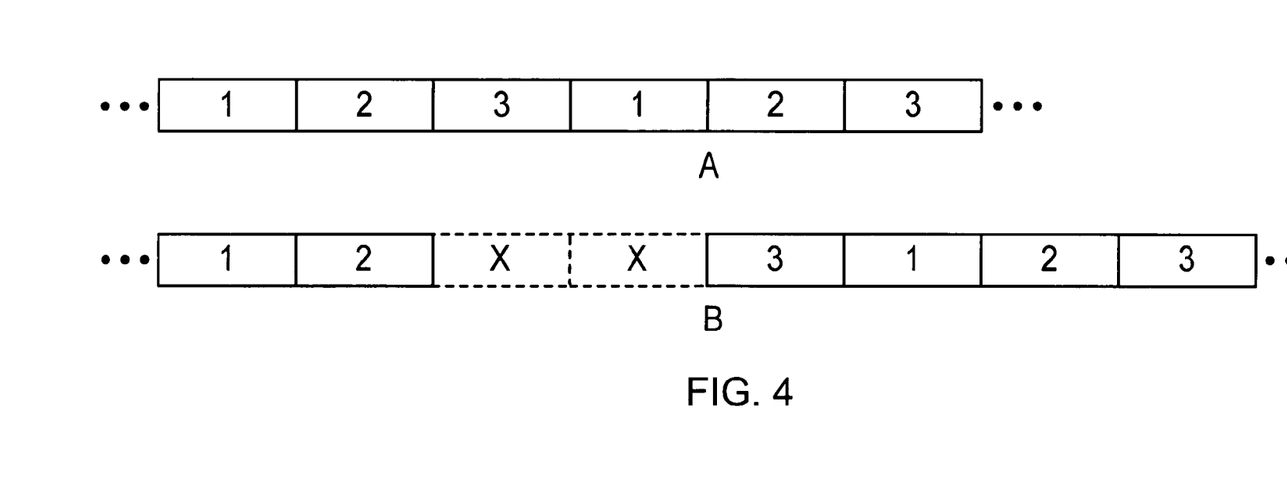
FIG. 4 frame sequence according to the invention.

The decoder must distinguish between a symbol or block which cannot be recovered due to noise or an attack between emission and reception, and a signal in which no watermark was embedded. This is facilitated by assigning to a symbol an additional ID in the encoder and evaluating it in the decoder. This can be performed by using for example a pre-determined quantity of different maximum-length data sequences in spread spectrum technology, e.g. different m-sequences. In FIG. 4 three different m-sequences are used. All symbols or blocks can be BPSK encoded, i.e. each one carries one bit of information. The first block uses the first m-sequence, the second block the second m-sequence, the third block the third m-sequence, the fourth block again the first m-sequence, and so on. The decoder uses the same m-sequence in the same order. In the example depicted in FIG. 4A, the m-sequences are used in the order 1, 2, 3, 1, 2, 3.

In FIG. 4B, as an example, the correlation of the third block with m-sequence three does not show a clear result (i.e. there is no clear magnitude peak in the corresponding correlation result). This means that either the WM symbol has been disturbed or that no WM symbol was embedded. The fourth block is therefore correlated with m-sequences one and three, which in this example both give no clear correlation result. The fifth block is correlated with the m-sequences one, two and three. Only the correlation with sequence three gives a clear peak, which means that the two previous blocks (3rd and 4th block) were empty and did not carry a WM symbol.

Figure 5:
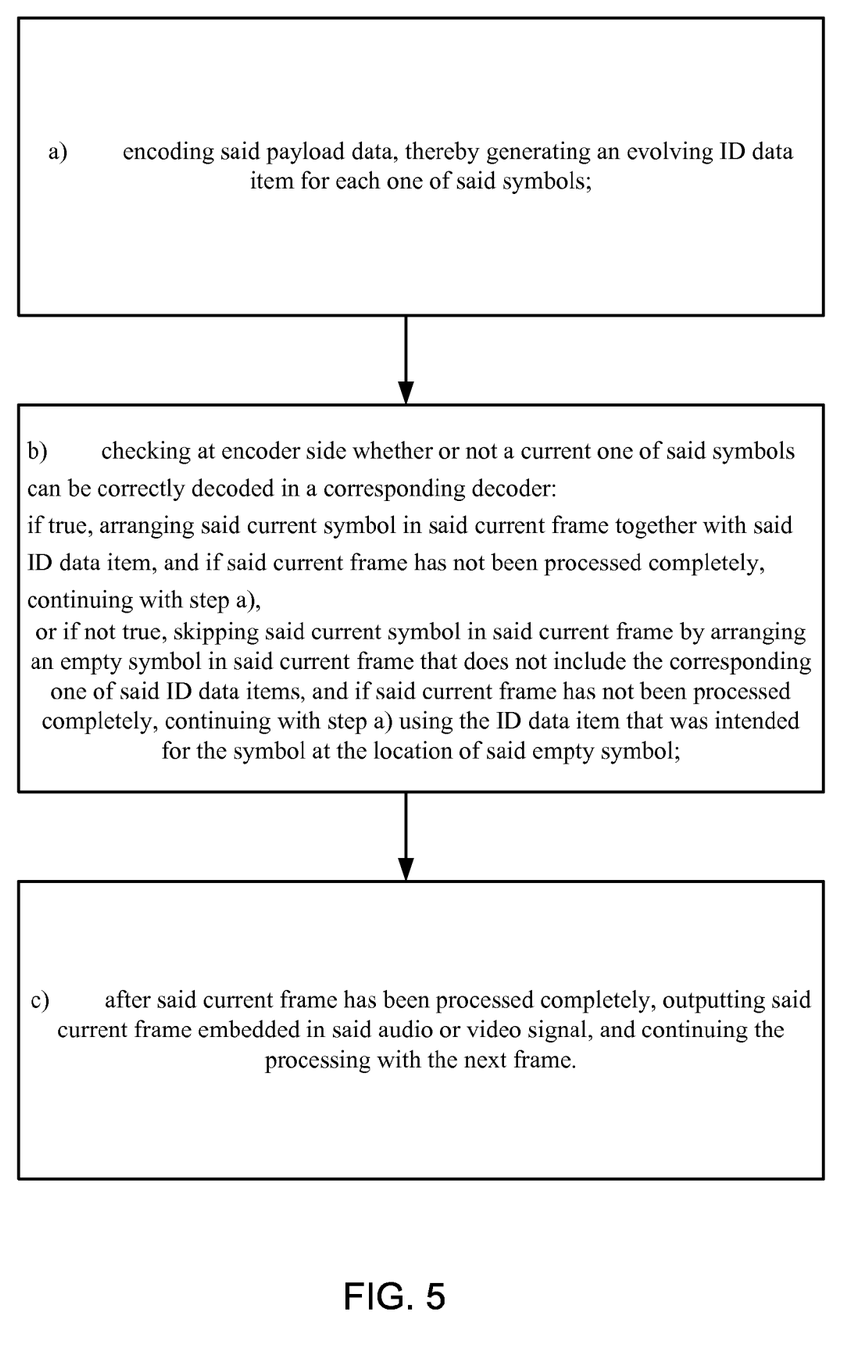
FIG. 5 an encoding process according to the invention.

FIG. 5 depicts an encoding process as described above. The process is suited for encoding symbols carrying payload data for watermarking therewith an audio or video signal, said watermarking using for example spread spectrum modulation whereby said symbols can be recovered by de-spreading and demodulation using correlation with a known data sequence, whereby said symbols can be recovered at decoding side, and whereby at least one of said symbols and at least one synchronization block are combined to form a current watermark frame, said method comprising the steps:

a) encoding said payload data, thereby generating an evolving ID data item for each one of said symbols;

b) checking at encoder side whether or not a current one of said symbols can be correctly decoded in a corresponding decoder:

if true, arranging said current symbol in said current frame together with said ID data item, and if said current frame has not been processed completely, continuing with step a), or if not true, skipping said current symbol in said current frame by arranging an empty symbol in said current frame that does not include the corresponding one of said ID data items, and if said current frame has not been processed completely, continuing with step a) using the ID data item that was intended for the symbol at the location of said empty symbol;

c) after said current frame has been processed completely, outputting said current frame embedded in said audio or video signal, and continuing the processing with the next frame.

What is claimed, is:

1. A method performed by a watermark encoder apparatus for encoding symbols carrying payload data for watermarking therewith an audio or video signal, whereby said symbols can be recovered at decoding side and whereby at least one of said symbols and at least one synchronization block are combined to form a current watermark frame, said method comprising the steps:

a) encoding, in said watermark encoder apparatus, said payload data and assigning a chronological identification data item ID to each one of said symbols;

b) checking at encoder side whether or not a current one of said symbols can be correctly decoded in a corresponding decoder:
   if true, arranging in said watermark encoder apparatus said current symbol in said current frame together with said ID data item, and if said current frame has not been processed completely, continuing with step a),
   or if not true, skipping in said watermark encoder apparatus said current symbol in said current frame by arranging an empty symbol in said current frame that does not include the corresponding one of said ID data items, and if said current frame has not been processed completely, continuing with step a) using the ID data item that was intended for the symbol at the location of said empty symbol;

c) after said current frame has been processed completely, outputting from said watermark encoder apparatus said current frame embedded in said audio or video signal, and continuing the processing with the next frame.

2. The method according to claim 1, wherein said encoding of said payload data is a modulation and spreading and wherein on said payload data an error correction and/or detection encoding is carried out before said modulation and spreading.

3. The method according to claim 1, wherein said encoding of said payload data is a modulation and spreading and wherein the output signal of said modulation and spreading is psycho-acoustically shaped before said checking is carried out.

4. The method according to claim 1, wherein each empty symbol inserted in said current frame increases the length of said current frame by one symbol length, such that each frame carries the same number of payload bits per frame.

5. The method according to claim 1, wherein said chronological ID data item is represented by different maximum-length data sequences and said correlation is carried out using said different maximum-length data sequences, for example a pre-determined quantity of different m-sequences, wherein said m-sequences can be BPSK encoded and each one carries one bit of information.

6. An apparatus for encoding symbols carrying payload data for watermarking therewith frame-by-frame an audio or video signal, whereby said symbols can be recovered in a decoder and whereby at least one of said symbols and at least one synchronization block are combined to form a current watermark frame, said apparatus comprising:
   a watermark encoder that encodes said payload data and assigns a chronological identifier data ID item to each one of said symbols;
   a decoder that checks whether or not a current one of said symbols can be correctly decoded, wherein:
     if the current one of said symbols can be decoded, the apparatus arranges said current symbol in said current frame together with said ID data item, and if said current frame has not been processed completely, continues processing in said encoder,
     or if the current one of said symbols cannot be decoded, the apparatus skips said current symbol in said current frame by arranging an empty symbol in said current frame that does not include the corresponding one of said ID data items, and if said current frame has not been processed completely, processing in the apparatus continues encoding using the ID data item that was intended for the symbol at the location of said empty symbol; and
   an output for outputting, after said current frame has been processed completely, said current frame embedded in said audio or video signal.

7. The apparatus according to claim 6, wherein said watermarking encoder encodes said payload data using a modulation and spreading and wherein on said payload data an error correction and/or detection encoding is carried out before said modulation and spreading.

8. The apparatus according to claim 6, wherein said watermarking encoder encodes said payload data using a modulation and spreading and wherein an output signal of said modulation and spreading is psycho-acoustically shaped before said decoder checks whether or not said current one of said symbols can be correctly decoded.

9. The apparatus according to claim 6, wherein each empty symbol inserted in said current frame increases the length of said current frame by one symbol length, such that each frame carries the same number of payload bits per frame.

10. The apparatus according to claim 6, wherein said chronological ID item is represented by different maximum-length data sequences and said correlation is carried out using said different maximum-length data sequences as a pre-determined quantity of different m-sequences, wherein said m-sequences can be BPSK encoded and each one carries one bit of information.

11. A method performed by a watermark decoder apparatus for decoding symbols carrying payload data of a watermarked audio or video signal, whereby at least one of said symbols and at least one synchronization block were combined to form a current watermark frame, wherein said audio or video signal was watermarked by:
   a) encoding said payload data, thereby generating an evolving ID data item for each one of said symbols;
   b) checking whether or not a current one of said symbols could be correctly decoded in a corresponding decoder:
     if true, said current symbol was arranged in said current frame together with said ID data item, and if said current frame had not been processed completely, the processing was continued with step a),
     or if not true, said current symbol was skipped in said current frame by arranging an empty symbol in said current frame that does not include the corresponding one of said ID data items, and if said current frame had not been processed completely, the processing was continued with step a) using the ID data item that was intended for the symbol at the location of said empty symbol;
   after said current frame was processed completely, outputting from the watermark decoder apparatus said current frame embedded in said audio or video signal, and continuing the processing with the next frame, and in that said watermark decoder apparatus performs the further step:
   following a decoding processing of a current symbol that is related to a current one of said ID data items, determining whether or not said decoding processing yields an explicit result:
     if true, providing said processed current symbol of said current frame and outputting said processed current symbol as payload data,
     or if not true, skipping said current symbol in said current frame, wherein said decoding processing is for example a correlation with a predetermined data sequence.

12. The method according to claim 11, wherein following said checking and complete processing of said current frame an error correction and/or detection decoding is carried out on said payload data.

13. The method according to claim 11, wherein said decoding is a de-spreading and demodulation of said symbols, using correlation with a known data sequence, and wherein before said de-spreading and demodulation a spectral whitening is carried out on said watermarked audio or video signal.

14. The method according to claim 11, wherein each empty symbol inserted in said current frame increases the length of said current frame by one symbol length, such that each frame carries the same number of payload bits per frame.

15. The method according to claim 11, wherein said evolving ID data item is represented by different maximum-length data sequences and said correlation is carried out using said different maximum-length data sequences, for example a pre-determined quantity of different m-sequences, wherein said m-sequences can be BPSK encoded and each one carries one bit of information.

16. An apparatus for decoding symbols carrying payload data of a watermarked audio or video signal, whereby at least one of said symbols and at least one synchronization block were combined to form a current watermark frame, and whereby said decoding apparatus recovers said symbols, wherein said audio or video signal was watermarked by:
 a) encoding said payload data, thereby generating an evolving ID data item for each one of said symbols;
 b) checking whether or not a current one of said symbols could be correctly decoded in a corresponding decoder:
  if true, said current symbol was arranged in said current frame together with said ID data item, and if said current frame had not been processed completely, the processing was continued with step a),
  or if not true, said current symbol was skipped in said current frame by arranging an empty symbol in said current frame that does not include the corresponding one of said ID data items, and if said current frame had not been processed completely, the processing was continued with step a) using the ID data item that was intended for the symbol at the location of said empty symbol;
 c) after said current frame was processed completely, outputting said current frame embedded in said audio or video signal, and continuing the processing with the next frame,
 and in that said decoding apparatus further determines, following a decoding processing of a current symbol that is related to a current one of said ID data items, whether or not said decoding processing yields an explicit result which:
  if true, provide said processed current symbol of said current frame,
  or if not true, skip said current symbol in said current frame,
 wherein said decoding processing is for example a correlation with a predetermined data sequence.

17. The apparatus according to claim 16, wherein following said checking and complete processing of said current frame an error correction and/or detection decoding is carried out on said payload data.

18. The apparatus according to claim 16, wherein said decoding is a de-spreading and demodulation of said symbols, using correlation with a known data sequence, and wherein before said de-spreading and demodulation a spectral whitening is carried out on said watermarked audio or video signal.

19. The apparatus according to claim 16, wherein each empty symbol inserted in said current frame increases the length of said current frame by one symbol length, such that each frame carries the same number of payload bits per frame.

20. The apparatus according to claim 16, wherein said evolving ID data item is represented by different maximum-length data sequences and said correlation is carried out using said different maximum-length data sequences, for example a pre-determined quantity of different m-sequences, wherein said m-sequences can be BPSK encoded and each one carries one bit of information.

* * * * *

UNITED STATES PATENT AND TRADEMARK OFFICE
CERTIFICATE OF CORRECTION

PATENT NO. : 7,634,031 B2  Page 1 of 1
APPLICATION NO. : 11/376530
DATED : December 15, 2009
INVENTOR(S) : Baum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Ninth Day of November, 2010

David J. Kappos
*Director of the United States Patent and Trademark Office*